United States Patent Office 3,658,931
Patented Apr. 25, 1972

3,658,931
LINEAR OLEFINS VIA OLEFIN DISPROPORTIONATION AND ETHYLENE-PROPYLENE CO-DIMERIZATION
Donald L. Crain and Paul R. Stapp, Bartlesville, Okla., assignors to Phillips Petroleum Company
Filed Dec. 11, 1969, Ser. No. 884,135
Int. Cl. C07c 3/62
U.S. Cl. 260—683 D
7 Claims

ABSTRACT OF THE DISCLOSURE

Linear olefins are prepared by a process of co-dimerizing ethylene and propylene to produce linear pentenes, and disproportionating the pentenes alone or in combination with the products of an olefin disproportionation reaction to provide the linear olefins. The ethylene and propylene feed materials can be provided by disproportionating propylene to provide ethylene and butenes and separating the butenes from the ethylene and propylene.

BACKGROUND OF THE INVENTION

Field of the invention

This invention relates to olefin disproportionation. In a further aspect, the invention relates to olefin disproportionation and ethylenepropylene co-dimerization. In a further aspect, the invention relates to a process of preparing linear olefins using the steps of olefin disproportionation and ethylene-propylene co-dimerization. In a still further aspect, the invention relates to a process of preparing linear olefins wherein ethylenepropylene are selectively co-dimerized to produce linear pentenes, and said pentenes are utilized in a disproportionation step to provide said linar olefins. In a further aspect, the invention relates to a process of preparing octene-4 from propylene.

Description of the prior art

The reaction of olefinic materials to produce other olefinic materials wherein the reaction can be visualized as the breaking of two existing double bonds between first and second carbon atoms, and between third and fourth carbon atoms, respectively, and the formation of two new existing bonds, such as between the first and third carbon atoms and the second and fourth carbon atoms, respectively, and wherein the two existing double bonds can be on the same or different molecules, has been called "the olefin reaction."' The breaking and formation of these double bonds can be visualized by using a mechanistic scheme involving a cyclobutane intermediate. Thus, two-unsaturated pairs of carbon atoms combine to form a four-center (cyclobutane) intermediate which then disassociates by breaking either set of opposing bonds.

Other terms have been utilized to describe reactions of olefinic materials which are within the scope of the olefin raction as defined above. These include such terms as "olefin disproportionation," "olefin dismutation," "trans-alkylidenation," and olefin metathesis." Throughout this specification and claims, the term "olefin disproportionation" is used as a matter of choice, and is deemed to be equivalent to the above-mentioned terms, including "the olefin reaction" terminology. Numerous catalyst systems have been reported which effect this reaction, including the catalysts of U.S. 3,261,879, Banks (1966), and U.S. 3,365,513, Heckelsberg (1968).

As is well known in the art of the conversion of olefins to other olefins of a given size or class, it is desirable to accomplish the desired conversion using as few steps as possible. It is also desirable to prepare higher molecular weight materials from more readily available lower molecular weight materials. With respect to olefin chemistry, it is also desirable to be able to prepare linear olefins as compared to branched olefins for many applications. In particular, linear olefins are useful as feedstocks for producing alcohols by way of the oxo-reaction, and for preparing alkylates for biodegradable detergent sulfonates.

SUMMARY OF THE INVENTION

We have discovered that linear olefins having 6 or more carbon atoms can be prepared in an efficient process comprising co-dimerizing ethylene and propylene to produce linear pentenes and utilizing the pentenes thus produced in a disproportionation reaction. Thus, ethylene and propylene are co-dimerized to produce linear pentene-1, and the pentene-1 is utilized alone or in combination with other linear olefins as feed to a disproportionation reactor to produce as a product of the process linear olefins having greater than 6 or more carbon atoms per molecule.

Further, in accordance with the invention, linear olefins are prepared from propylene by disproportionating propylene to ethylene and butenes, and passing a mixture of the ethylene and propylene to a co-dimerization reactor. In the co-dimerization reactor, principally pentene-1 is produced. The pentene-1 thus produced by the selective co-dimerization step is passed to a second disproportionation reactor wherein the pentene-1 may be combined with a narrow molecular weight fraction of linear olefins and used as the feed material to another disproportionation reactor. A series of disproportionation steps using a series of disproportionation reactors results in the preparation of linear olefins having up to 30 carbon atoms in number. In each disproportionation step, the ethylene or propylene produced can be returned to the co-dimerization reactor.

Further in accordance with the invention, octene-4 is prepared by the process of co-dimerizing ethylene-propylene to provide pentene-1, rejecting any heavies produced, and disproportionating the pentene-1 to provide octene-4 and ethylene. In the preparation of octene-4, the starting-materials for the co-dimerization reaction can be the ethylene and unconverted propylene separated from the effluent of a disproportionation step using propylene as a feed material.

DETAILED DESCRIPTION OF THE INVENTION

The invention provides certain advantages over prior art processes. The difficult separation of ethylene and propylene can be eliminated, if desired. At no point is pure ethylene, free from propylene, required. The equipment required to conduct the disproportionation reactions can be reduced in size by a substantial amount. The reduction in size is accomplished because the processes of the invention require smaller amounts of propylene to be disproportionated. The smaller amount of propylene disproportionation results in less production of excess ethylene.

Another significant advantage is the fact that the solid catalyst separation from the pentene-1 produced in the co-dimerization reactor is extremely simple and straightforward as compared, for example, to the separation of soluble organoaluminum catalysts in some ethylene oligomerization reactions. Furthermore, it is significant that pentene-1 is produced in large quantities using the process of the invention which enables the preparation of the higher linear olefins to be accomplished in fewer steps than heretofore possible. Of particular importance in the present process is that butenes are not needed as feed to a disproportionation step in order to provide the higher linear olefin products. This means that one can process the butenes as he desires, for example, as feed to a dehydrogenation section to produce butadiene.

Figure 1:
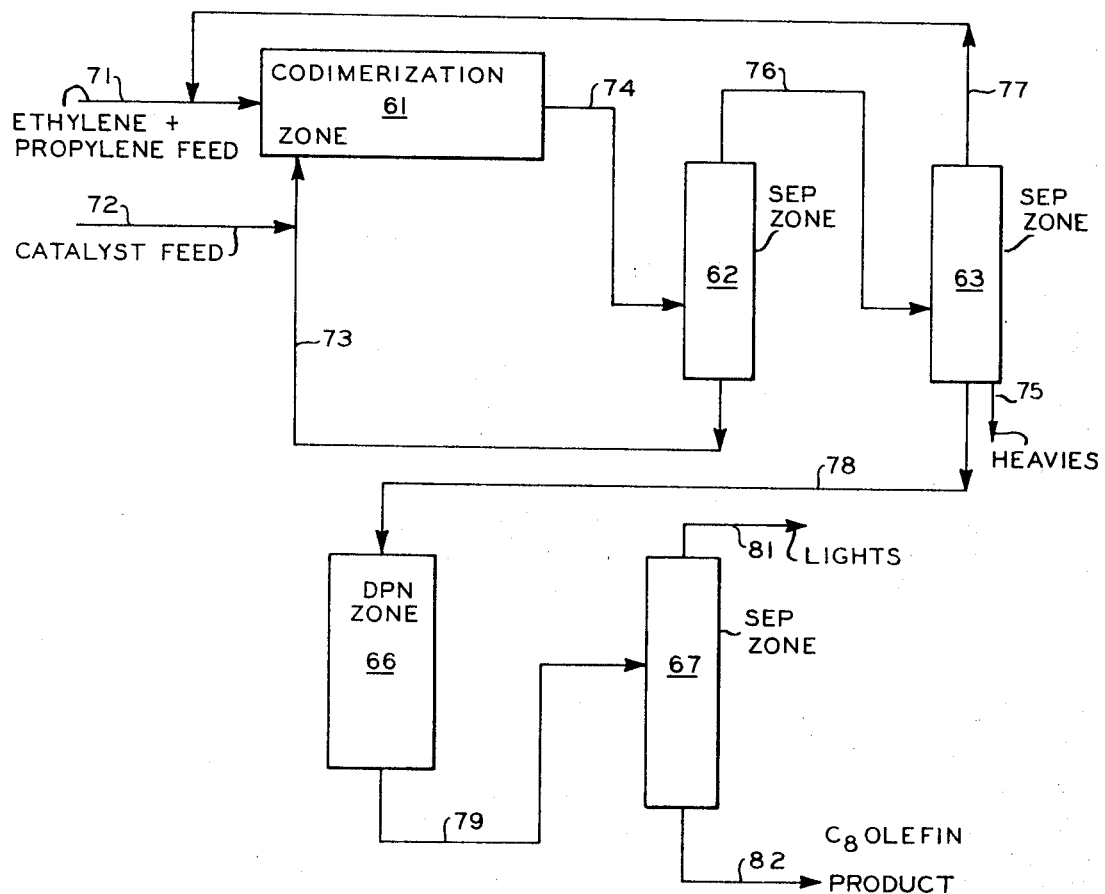
FIG. 1 of the drawing is a schematic flow diagram of the process of the invention illustrating the preparation of octene-4 from a mixture of ethylene and propylene.

The invention can best be understood by referring to FIG. 1 of the drawing which schematically illustrates the process of the invention of preparing octene-4 in two chemical steps from a mixture of ethylene and propylene. In FIG. 1, the co-dimerization zone 61 receives propylene and ethylene from line 71 and catalyst make up via lines 72 and 73. Linear pentenes, containing a high proportion of pentene-1, are removed from zone 61 by line 74 and passed to stripper 62 wherein catalyst is removed by line 73 and recycled back to co-dimerization zone 61. The overhead line 76 of stripper 62 carries linear pentenes, unconverted ethylene and propylene to fractionator 63. The ethylene-propylene mixture is removed from fractionator 63 via line 77 and returned to zone 61. Branched and heavy by-products are removed through line 75.

Linear octenes are prepared in a disproportionation zone 66 by converting the linear pentenes, principally pentene-1, from fractionator 63 by way of line 78. The disproportionation of pentene-1 yields octene-4 and ethylene plus smaller amounts of other olefins such as propylene and linear hexenes and heptenes. The reaction effluent in line 79 is fractionated in a second fractionator 67, taking an ethylene and other lights overhead in line 81 and an octene stream 82 as bottoms from the fractionator. The ethylene and lighter material in line 81 can be subjected to an additional separation step to provide ethylene and propylene recycle to line 71 and co-dimerization zone 61.

The linear octenes are suitable feed olefins for preparing linear alcohols by way of the so-called "oxo-process." These alcohols are extremely valuable as plasticizers in various synthetic resin formulations. One should note the ease and simplicity of the above process in preparing these useful intermediates. The process is especially attractive when one realizes that the ethylene-propylene feed may be provided by disproportionating propylene to ethylene and butenes, separating the butenes from the reaction mixture, and passing the resulting ethylene-propylene stream to the co-dimerization reactor. Because the co-dimerization feed is an approximately equimolar mixture of ethylene and propylene, there is generally no need to completely separate these olefins one from another.

Figure 2:
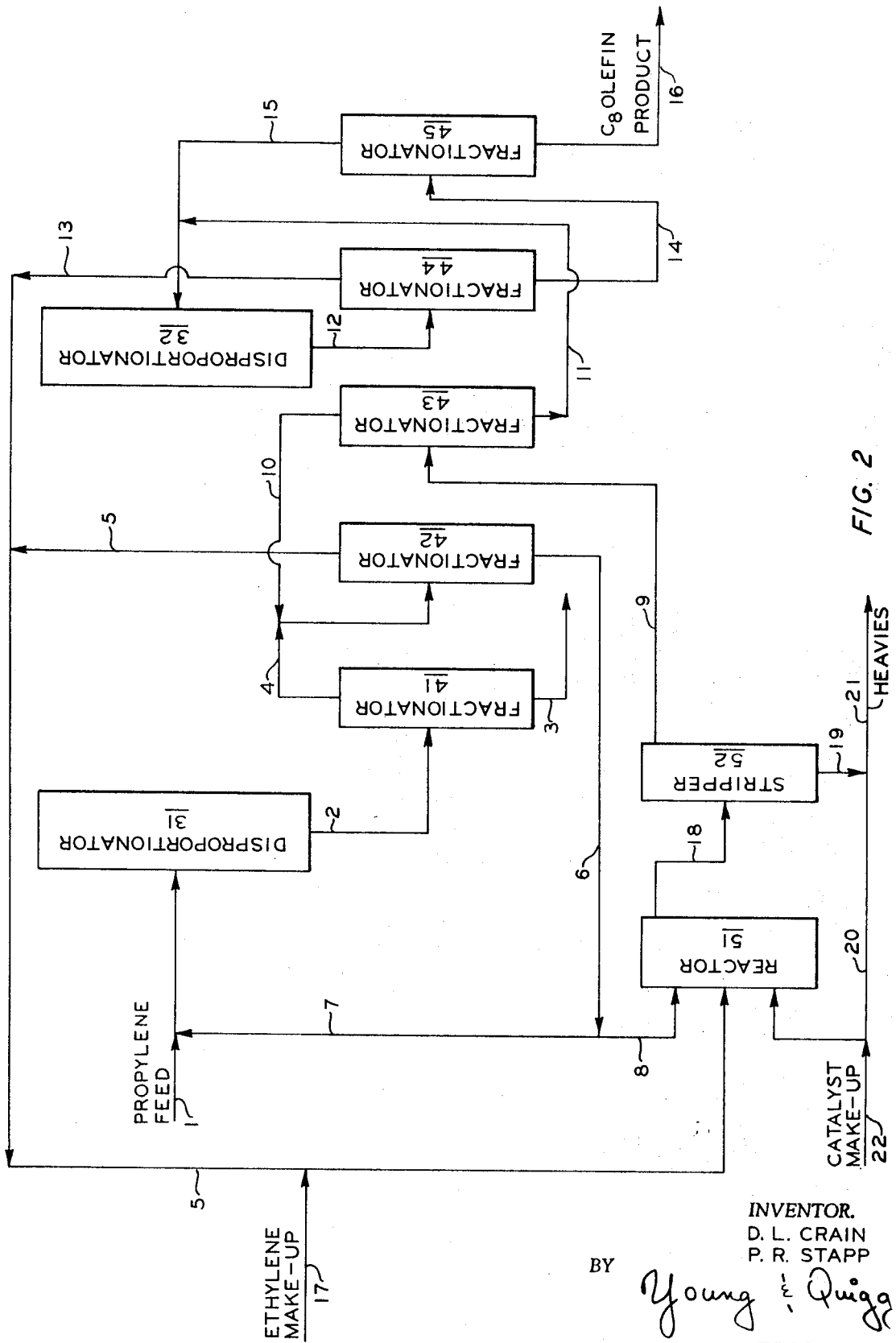
FIG. 2 of the drawing is a schematic flow diagram of the process of the invention illustrating the preparation of linear olefins from propylene.

FIG. 2 of the drawing illustrates in more detail a process whereby propylene can be converted to linear olefins in high yields in a minimum amount of equipment. FIG. 2 schematically presents disproportionators 31 and 32, five fractionators 41 through 45, a co-dimerization reactor 51 and a stripper 52. Propylene is carried to disproportionator 31 by line 1, ethylene and butene are produced therein, and passed via line 2 to the first fractionator 41. Therein, the unreacted propylene and ethylene is taken overhead in line 4 to the second stage fractionator 42. Butenes and heavier hydrocarbons associated therewith are removad by line 3 and processed as desired. The overhead line 44 is combined with the overhead line 10 from fractionator 43 and passed into fractionator 42 wherein ethylene is taken overhead in line 5 and propylene is removed via line 6. Some of the propylene in line 6 is returned via line 7 to zone 31. Although it is not necessary to separate the ethylene and propylene stream, it is highly desirable to do so when preparing $C_8$ linear olefins from propylene in order to adjust the ratio of ethylene to propylene being fed to reactor 51 in the co-dimerization section.

The propylene fratcion to the co-dimerization reactor 51 enters by way of line 8 while the ethylene is introduced by line 5. Ethylene make-up can be introduced as needed to line 5 by way of line 17, thus assuring the proper ratio of propylene to ethylene in reactor 51. Catalytic co-dimerization produces pentene-1 and heavier hydrocarbons which are passed via line 18 to stripper 52. In stripper 52, ethylene, propylene and pentenes are taken overhead while catalyst, solvent, and heavies are removed from the bottom of the stripper via line 19. Heavies and branched products can be rejected from the system via line 21, while line 20 provides catalyst and solvent recycle to the reactor 51. Make-up catalyst is introduced into line 20 by line 22.

The overhead of stirpper 52 is passed via line 9 into fractionator 43 wherein the ethylene and propylene are taken overhead by line 10 and recycled back to the first disproportionation stage and co-dimerization section. The pentenes are removed from the bottom of fractionator 43 and carried via line 11 into the second disproportionation reactor 32.

Within reactor 32, the disproportionation of pentene-1 yields octene-4 and ethylene. The effluent from the reactor 32 carried by line 12 is passed to fractionator 44 wherein ethylene is removed overhead via line 13 and returned to the co-dimerization section by way of line 5. Octene-4 and unconverted pentene-1 are passed into the fractionator 45 wherein pentene-1 is removed overhead to be returned in line 15 to reactor 32. Product octene-4 is recovered as the bottom product of fractionator 45 in line 16.

The above-mentioned process can be continued in a third stage disproportionation reactor (not shown) wherein the octene-4 along with heptenes, octenes, and nonenes can be disproportionated to yield linear olefins having up to 10–15 carbon atoms per molecule. This process can be continued using a series of disproportionation reactors until linear olefins having up to approximately 30 carbon atoms are produced. In each instance, the formation of any branched hydrocarbons in the disproportionators requires that these hydrocarbons be rejected in the first separation step after the disproportionation reactor in order to insure that the product maintains its linear characer. Lighter materials and unconverted materials are recycled to appropriate reactors. The $C_6$–$C_{30}$ olefins are commercially important materials for preparing detergent alkylate and for preparing alcohols by way of the oxo-reaction. The above-mentioned process can be combined with other well-known processes to utilize products prepared by the process of the invention. For example, the butenes produced in the process as depicted in FIG. 2 of the drawing can be used as feed in another disproportionation reactor to form pentenes and hexenes and thus become a part of the series of disproportionation reactors mentioned above. Alternatively, butenes can be conducted to an operation wherein butadiene is prepared.

When the process of the present invention is used as part of a series of olefin disproportionation stages wherein realtively low molecular weight linear olefins can be converted to higher molecular weight linear olefins, the feedstock for such a series of steps can be any of the linear olefins of lower molecular weight than the desired product olefin. Thus, one or more olefins such as normal butenes, normal pentenes, and the like can be introduced into the appropriate disproportionation reactor. Their disproportionation products are, in turn, separated and conducted to the appropriate reactors. Because of its low cost and ready availability, however, propylene is generally the preferred feedstock.

The olefin disproportionation catalysts suitable for use in the process of the present invention are any of the catalysts which have ability for converting propylene to ethylene and butene. These catalysts are sometimes referred to in the art as "olefin reaction" catalysts. These catalysts are now well known in the art. The methods of preparation and the use of these disproportionation catalysts are now conventional. Solid olefin disproportionation catalysts are presently preferred. Some examples of the preferred catalyst systems are molybdenum oxide on alumina, tungsten oxide on silica, and rhenium oxide on alumina. Included in those catalysts which are operable in the process of the invention are homogeneous catalysts which can be deposited on suitable support materials. Among those are bis(triphenylphosphine)dinitrosyldichloromolybdenum admixed with methylaluminum sesquichloride. This catalyst can be deposited on a suitably calcined support, such as silica gel or the like.

Because of the wide variety of catalysts which are available for use in the disproportionation step of the invention, the temperature, pressures, flow rates, ratios of catalyst to feed materials, and other operating conditions will vary over a wide range. The molecular weight of the olefin feed material, the optimum temperature, pressure, and contact times for the particular catalysts employed, the distribution of disproportionation products desired, will all affect the operating conditions to be used in the reaction zones and subsequent separation operations. Therefore, the particular conditions employed can be easily selected by one skilled in the art.

The co-dimerization stage of the present invention can employ any catalyst system which is capable of selectively converting ethylene and propylene to a reaction product comprising a substantial amount of linear pentenes, particularly pentene-1. It is highly desirable that the formation of branched pentenes be avoided as much as possible. A number of catalyst systems which have the above-mentioned properties are available in the art. A particularly useful class of such catalysts are those containing alkali metals. Those containing free alkali metals, e.g., sodium, potassium, lithium, rubidium, and cesium; alloys of these metals, such as NaK alloy; and organo-alkali metal compounds are preferred. Of the above, the organo-alkali metal compounds are especially useful, and especially good results are obtained when the organo portion is an aromatic or saturated aliphatic hydrocarbon radical, and the alakli metal is soduim or potassium.

The most preferred group of the above-mentioned catalysts is represented by the formula

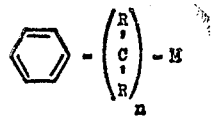

wherein M is sodium or potassium, R is methyl, ethyl, or phenyl, and $n$ is 0–1. Some examples of these co-dimerization catalysts are phenylpotassium phenylsodium, triphenylmethylsodium, triphenylmethylpotassium, α,α-dimethylbenzylsodium, α,α-dimethylbenzylpotassium, α-ethyl-α-methylbenzylsodium, α,α-diethylbenzylpotassium, and the like, and mixtures thereof.

The conditions for the co-dimerization reaction will vary, depending upon the specific catalyst chosen. In general, the reaction temperature will be in the range of from about 50 to about 750° F. When the preferred hydrocarbyl-alkali metal catalysts are employed, the co-dimerization temperature will be in the range of from about 280 to about 525° F. Pressure will generally be in the range of 100–1500 p.s.i.g. Continuous or batchwise operations can be used with reaction times in the range of 0.1 to 50 hours. If desired, the co-dimerization can be carried out in the presence of an inert diluent, generally, an inert hydrocarbon diluent such as benzene, n-pentane, cyclohexane, dodecane, and the like, and mixtures thereof. The weight ratio of olefin feed to catalyst will normally range from about 5:1 to about 100:1 and the mole ratio of ethylene to propylene in the reaction zone will generally be about 1:1 to 1:2, preferably about equimolar.

Depending on the specific disproportionation and co-dimerization catalyst chosen to carry out the steps of the invention, any suitable reaction technique can be utilized, such as fixed bed reaction, fluidized bed reaction, liquid phase batch and continuous operations, and the like. Conventional methods can be used to separate the materials present in the reaction effluent, including fractionation, crystallization, adsorption, and the like. Fractionation is generally preferred. The apparatus in which the process of the invention is carried out are well known in the art.

The operation of the invention can best be understood by reference to the following illustrative example of the invention.

ILLUSTRATIVE EXAMPLE

Octene-4 is prepared from a propylene feed by a process as depicted in FIG. 2 of the drawing. The disproportionation reactors 31 and 32 utilize tungsten oxide on silica as the catalyst. The catalyst is prepared and is utilized in accordance with the procedure described by Heckelsburg, U.S. 3,365,513. The conditions of operation in disproportionator 31 include a temperature of 800° F., weight hourly space velocity of 30, and 400 p.s.i.g. Forty percent conversion of propylene to ethylene and butenes is obtained.

The disproportionation of pentene-1 to octene-4 and ethylene in disproportionator 32 occurs at 700° F., WHSV of 50, and 40 p.s.i.g. Forty percent conversion is obtained. The catalyst is 8% $WO_3$ on silica and is additionally base-treated to contain 0.2 weight percent Na before calcination.

Co-dimerization reactor 51 usese a catalyst of 2–5 weight percent (based on the weight of the feed olefins) of phenylpotassium in dodecane diluent. The operating conditions include a temperature of 300° F., residence time of 30 minutes, conversion of 72 percent, and a yield of pentene-1 of 85 percent. The fractionators are operated at suitable temperatures and pressures to effect the separations mentioned above when discussing FIG. 2 of the drawing.

A material balance of the various streams is set forth in Table I.

TABLE I

| Material, lbs./hr.: | Stream number | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 21 |
| Ethylene | | 560 | | 560 | 1,065 | | | | 505 | 505 | | 560 | 560 | | | | 195 | |
| Propylene | 3,655 | 3,520 | | 3,520 | | 3,275 | 545 | 2,730 | 755 | 755 | | | | | | | | |
| Butene-2 | | | 1,120 | 1,120 | | | | | | | | | | | | | | |
| Pentene-1 | | | | | | | | 2,800 | | 2,800 | 4,200 | | 4,200 | 4,200 | | | | |
| Octene-4 | | | | | | | | | | | 2,240 | | 2,240 | | 2,240 | | | |
| Heavies | | | | | | | | | | | | | | | | | | 490 |

The above table graphically illustrates the ability of the process of the invention to convert propylene into octene-4. Accordingly, the above-described invention provides a convenient way of upgrading lower molecular weight olefins such as propylene to linear olefins having up to about 30 carbon atoms per molecule utilizing ethylene-propylene co-dimerization in combination with olefin disproportionation.

Reasonable variations and modifications of our invention are possible without departing from the spirit and scope thereof. The experimental data included herein is for the purpose of illustration, and should not be construed as unduly limiting the scope of our invention.

We claim:
1. A process for the preparation of octene-4 comprising the steps of
   (1) co-dimerizing ethylene and propylene to produce an effluent comprising pentene-1 and a heavier fraction,
   (2) separating the pentene-1 from the heavier fraction,
   (3) disproportionating said pentene-1 to produce an effluent containing octene-4 and ethylene,
   (4) separating the effluent of step (3) to provide octene-4 as a product of the process and a stream of ethylene, and
   (5) returning the ethylene of step (4) as at least part of the ethylene feed to step (1).

2. A process according to claim 1 wherein ethylene and propylene utilized in step (1) are prepared by disproportionating propylene to provide an effluent comprising ethylene, butenes, and unconverted propylene, removing the butenes from the system, separating the ethylene and propylene, recycling a portion of the propylene to step (1), and combining the remaining propylene and separated ethylene to provide the feed material for step (1).

3. A process according to claim 2 wherein the unconverted ethylene and propylene from co-dimerization is separated and recycled to the disproportionation section.

4. A process of preparing a stream comprising octenes by the steps of
   (1) co-dimerizing ethylene and propylene to provide a stream comprising ethylene, propylene and pentene-1;
   (2) separating the pentene-1 from the stream produced by step (1);
   (3) disproportionating the pentene-1 of step (2) to provide a stream comprising octenes and ethylene;
   (4) separating the stream comprising octenes and ethylene to recover the stream comprising octenes as a product of the process; and
   (5) returning the separated ethylene of step (4) to step (1).

5. The process of claim 4 further including the preparation of butenes, which comprises providing substantial amounts of the ethylene and propylene to step (1) by (a) disproportionating propylene to provide a stream comprising ethylene, propylene, and butenes, (b) separating the butenes from the stream produced by step (a) as a product of the process, and (c) passing the ethylene and propylene stream produced by step (b) to step (1).

6. A process of preparing butenes and linear olefins having from 6 to about 30 carbon atoms comprising
   (1) disproportionating propylene to provide a stream comprising ethylene, propylene and butenes;
   (2) separating the butenes from the stream produced by step (1) as a product of the process;
   (3) co-dimerizing the ethylene and propylene of step (2) to provide a stream of pentene-1 and a heavier fraction;
   (4) separating the pentene-1 from the stream of step (3);
   (5) disproportionating pentene-1 from step (4) to provide a stream comprising octenes and ethylene;
   (6) separating the stream comprising octenes and ethylene to provide a stream comprising ethylene which is returned to step (3);
   (7) admixing the stream comprising octenes with linear olefins having 7–9 carbon atoms per molecule;
   (8) disproportionating the admixed olefins of step (7) to provide a stream of linear olefins having a greater number of carbon atoms than those present in the admixed olefins of step (7), lighter olefins having a lesser number of carbon atoms than those present in the admixed olefins of step (7), branched olefins, and a heavier fraction containing hydrocarbons which are heavier in molecular weight than the heaviest of the linear product olefins of the process;
   (9) separating the linear and branched olefins from the stream of step (8) to provide a stream of linear and branched olefins having a greater number of carbon atoms than those present in the admixed olefins of step (7); and
   (10) separating the linear olefins from the branched olefins from the stream of step (7) as a product of the process.

7. A process according to claim 6 wherein the propylene in the stream produced by step (1) which is not utilized as feed to the co-dimerization reactor in step (3) is separated and recycled to step (1).

References Cited
UNITED STATES PATENTS

| | | | |
|---|---|---|---|
| 3,261,879 | 7/1966 | Banks | 260—683 |
| 3,251,895 | 5/1966 | Wilkes | 260—668 |
| 3,491,163 | 1/1970 | Kenton et al. | 260—683 |
| 3,296,330 | 1/1967 | Sherk | 260—683 |
| 3,544,649 | 12/1970 | Dixon et al. | 260—683 |
| 3,535,401 | 10/1970 | Calderon et al. | 260—683 |

DELBERT E. GANTZ, Primary Examiner

C. E. SPRESSER, JR., Assistant Examiner

U.S. Cl. X.R.
260—683.15 D